United States Patent
Lee et al.

(10) Patent No.: US 11,552,671 B2
(45) Date of Patent: Jan. 10, 2023

(54) METHOD AND APPARATUS FOR REMOVING SELF-INTERFERENCE SIGNAL IN FULL-DUPLEX COMMUNICATION SYSTEM

(71) Applicants: Samsung Electronics Co., Ltd., Gyeonggi-do (KR); Research & Business Foundation SUNGKYUNKWAN UNIVERSITY, Gyeonggi-do (KR)

(72) Inventors: Kwonjong Lee, Gyeonggi-do (KR); Sang-Hyo Kim, Gyeonggi-do (KR); Hyojin Lee, Gyeonggi-do (KR); Min Young Chung, Seoul (KR); Dong Hyun Kong, Seoul (KR); Seungil Park, Gyeonggi-do (KR); Hyosang Ju, Gyeonggi-do (KR)

(73) Assignees: Samsung Electronic Co., Ltd.; Research & Business Foundation Sungkyunkwan University

( * ) Notice: Subject to any disclaimer, the term of this patent is extended or adjusted under 35 U.S.C. 154(b) by 10 days.

(21) Appl. No.: 16/936,068

(22) Filed: Jul. 22, 2020

(65) Prior Publication Data
US 2021/0028814 A1 Jan. 28, 2021

(30) Foreign Application Priority Data
Jul. 24, 2019 (KR) .................. 10-2019-0089792

(51) Int. Cl.
H04B 1/525 (2015.01)
H04L 5/14 (2006.01)

(52) U.S. Cl.
CPC .............. *H04B 1/525* (2013.01); *H04L 5/14* (2013.01)

(58) Field of Classification Search
CPC ........... H04B 1/123; H04B 1/525; H04L 5/14
See application file for complete search history.

(56) References Cited

U.S. PATENT DOCUMENTS

| | | | |
|---|---|---|---|
| 2017/0033916 A1* | 2/2017 | Stirling-Gallacher | H04L 5/1438 |
| 2017/0163404 A1* | 6/2017 | Liu | H04W 72/0413 |
| 2018/0205533 A1* | 7/2018 | Lee | H04L 5/1461 |

FOREIGN PATENT DOCUMENTS

| | | |
|---|---|---|
| KR | 1020160067870 | 6/2016 |
| KR | 1020170061087 | 6/2017 |

OTHER PUBLICATIONS

Bharadia, Dinesh et al.. 2013. Full duplex radios. In Proceedings of the ACM SIGCOMM 2013 conference on SIGCOMM (SIGCOMM '13). Association for Computing . . . Machinery, New York, NY, USA, 375-386. DOI:https://doi.org/10.1145/2486001.2486033.

(Continued)

*Primary Examiner* — Kibrom T Hailu
*Assistant Examiner* — Nizam U Ahmed
(74) *Attorney, Agent, or Firm* — The Farrell Law Firm, P.C.

(57) ABSTRACT

A method of a first communication device for removing a self-interference signal in a wireless communication system is provided. The method includes receiving a signal having a size less than a first threshold value from a second communication device in a first interval within a first frame, transmitting a first signal to a third communication device in the first interval, and estimating a self-interference channel through which the self-interference signal is transmitted based on the signal received in the first interval and the first signal transmitted in the first interval. The self-interference signal is a signal transmitted by the first communication (Continued)

device and is received by the first communication device through the self-interference channel.

12 Claims, 12 Drawing Sheets

(56) References Cited

OTHER PUBLICATIONS

Sabharwal, A. et al., "In-Band Full-Duplex Wireless: Challenges and Opportunities," in IEEE Journal on Selected Areas in Communications, vol. 32, No. 9, . . . pp. 1637-1652, May 20, 2014, doi: 10.1109/JSAC.2014.2330193.

* cited by examiner

FIG. 14

| HIGH POWER | NEAR ZERO POWER | NEAR ZERO POWER | NEAR ZERO POWER |
|---|---|---|---|

TRANSMISSION PATTERN OF
FIRST COMMUNICATION DEVICE

| NEAR ZERO POWER | HIGH POWER | NEAR ZERO POWER | NEAR ZERO POWER |
|---|---|---|---|

TRANSMISSION PATTERN OF
SECOND COMMUNICATION DEVICE

| NEAR ZERO POWER | NEAR ZERO POWER | HIGH POWER | NEAR ZERO POWER |
|---|---|---|---|

TRANSMISSION PATTERN OF
THIRD COMMUNICATION DEVICE

| NEAR ZERO POWER | NEAR ZERO POWER | NEAR ZERO POWER | HIGH POWER |
|---|---|---|---|

TRANSMISSION PATTERN OF
FOURTH COMMUNICATION DEVICE

FIG. 15

| HIGH POWER | NEAR ZERO POWER | NEAR ZERO POWER | NEAR ZERO POWER |
|---|---|---|---|

TRANSMISSION PATTERN OF
FIRST COMMUNICATION DEVICE

| NEAR ZERO POWER | HIGH POWER | NEAR ZERO POWER | NEAR ZERO POWER |
|---|---|---|---|

TRANSMISSION PATTERN OF
SECOND COMMUNICATION DEVICE

| HIGH POWER | NEAR ZERO POWER | NEAR ZERO POWER | NEAR ZERO POWER |
|---|---|---|---|

TRANSMISSION PATTERN OF
THIRD COMMUNICATION DEVICE

| NEAR ZERO POWER | NEAR ZERO POWER | NEAR ZERO POWER | HIGH POWER |
|---|---|---|---|

TRANSMISSION PATTERN OF
FOURTH COMMUNICATION DEVICE

FIG. 16
| HIGH POWER | ZERO OR LOW POWER | HIGH POWER | ZERO OR LOW POWER | HIGH POWER | HIGH POWER | ZERO OR LOW POWER |
FIG. 17
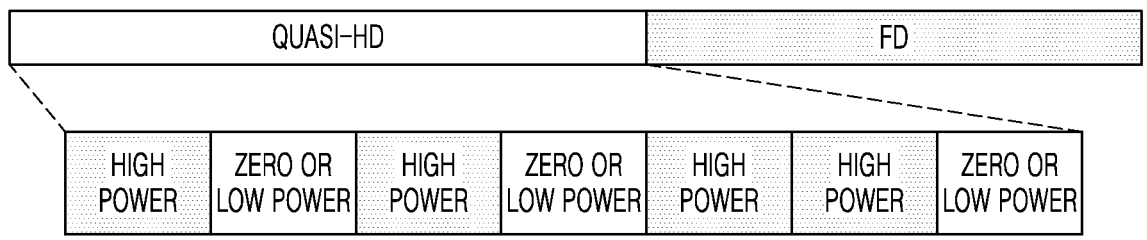
FIG. 18
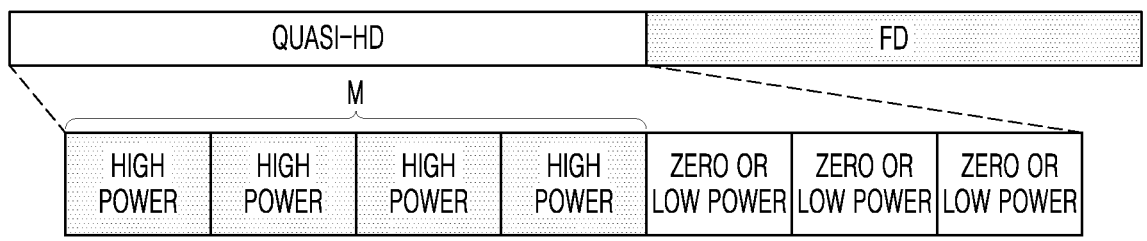

FIG. 19

| HIGH POWER | NEAR ZERO POWER | NEAR ZERO POWER | HIGH POWER | NEAR ZERO POWER | HIGH POWER | HIGH POWER |

TRANSMISSION SLOT PATTERN OF FIRST COMMUNICATION DEVICE

| HIGH POWER | HIGH POWER | NEAR ZERO POWER | NEAR ZERO POWER | HIGH POWER | NEAR ZERO POWER | HIGH POWER |

TRANSMISSION SLOT PATTERN OF SECOND COMMUNICATION DEVICE

| HIGH POWER | HIGH POWER | HIGH POWER | NEAR ZERO POWER | NEAR ZERO POWER | HIGH POWER | NEAR ZERO POWER |

TRANSMISSION SLOT PATTERN OF THIRD COMMUNICATION DEVICE

FIG. 20

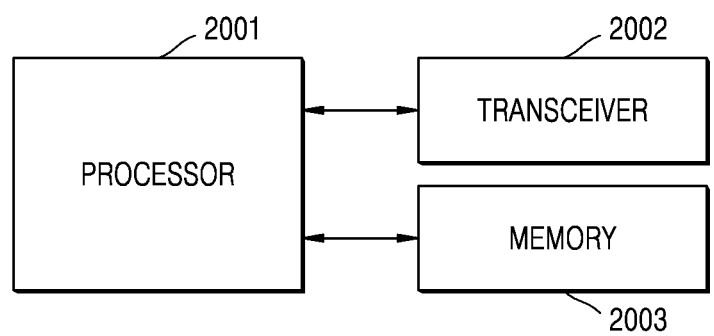

METHOD AND APPARATUS FOR REMOVING SELF-INTERFERENCE SIGNAL IN FULL-DUPLEX COMMUNICATION SYSTEM

CROSS-REFERENCE TO RELATED APPLICATION(S)

This application is based on and claims priority under 35 U.S.C. C. § 119 to Korean Patent Application No. 10-2019-0089792, filed on Jul. 24, 2019, in the Korean Intellectual Property Office, the disclosure of which is incorporated by reference herein in its entirety.

BACKGROUND

1. Field

The present disclosure relates generally to a method and apparatus for removing a self-interference signal in a full-duplex communication system.

2. Description of Related Art

With the increase of services requiring high-speed data transmission and the development of the Internet of things (IoT), it is continuously required to improve the efficiency of spectrum resources of wireless networks. Accordingly, various studies have been conducted to develop a bandwidth, a data rate, etc. full-duplex (FD) communication systems have been spotlighted as next-generation technology for improving the efficiency of insufficient frequency resources. In-band FD communication is wireless communication technology that simultaneously performs transmission and reception in the same frequency band. FD communication may theoretically double network communication capacity achieved by half-duplex (HD) communication using the same frequency band. Theoretically, a self-interference signal that may be generated during FD communication may be accurately determined and easily removed, but in reality, there is a difficulty in implementation due to a large power difference between the self-interference signal and a desired signal.

In FD communication, a self-interference cancellation method includes estimating and removing a self-interference signal by using information about its own transmission signal. Self-interference cancellation is generally performed in a propagation domain, an analog domain, and a digital domain. A propagation domain self-interference cancellation method includes enabling a self-interference signal to be attenuated and received by a receiving antenna through an antenna design or arrangement without additional signal processing. Different propagation domain self-interference cancellation methods are used in a separate antenna environment where a transmitting antenna and a receiving antenna are separated and in a shared antenna environment where a transmitting antenna and a receiving antenna are shared as a single physical structure. A propagation domain self-interference cancellation domain in a separate antenna environment includes a method of arranging self-interference signals to cancel each other at a position of a receiving antenna by using multiple transmitting antennas.

A propagation domain self-interference cancellation method in a shared antenna environment includes a method of reducing power of a signal transmitted from a transmitting end to a receiving end by using a circulator. An analog domain self-interference cancellation method includes estimating and removing a received self-interference signal by referring to a transmission signal that mainly passes through a power amplifier in an analog domain of a transmitter. A digital domain self-interference cancellation method includes estimating and removing a self-interference signal by using a digital signal of a transmitter. When a final residual self-interference signal is reduced to a power level of an external interference signal or thermal noise, a self-interference cancellation method is successful.

Among such self-interference cancellation methods, a digital domain self-interference cancellation method performs self-interference cancellation by estimating a self-interference channel in a digital domain. In an existing FD communication system, a static channel is mainly assumed, a self-interference channel is estimated in a situation where a desired signal is not input to a receiving end, and a self-interference signal is removed by using pre-estimated self-interference channel information during FD communication. At this time, the desired signal is a signal transmitted by an FD communication partner to be received by the receiving end. When a channel is static, one self-interference channel estimated value may be used for a long time. Because updating of channel estimation may be set in a very slow cycle, self-interference cancellation only needs to be performed when there is no desired signal. However, in a communication environment such as mobile communication, because a signal transmitted through a transmitting antenna is reflected in a surrounding changing environment, a channel for a component entering a receiving antenna generally has a time-varying property, and thus an overall self-interference channel may be time-variant. Accordingly, unless self-interference channel information is updated by timely estimating a self-interference channel in an environment where the self-interference channel changes, self-interference cancellation performance may be greatly degraded.

Therefore, there is a demand for a method of maintaining high channel estimation and self-interference cancellation performance even in an environment where a self-interference channel changes.

SUMMARY

The present disclosure has been made to address at least the disadvantages described above and to provide at least the advantages described below.

In accordance with an aspect of the present disclosure, a method of a first communication device for removing a self-interference signal in a wireless communication system is provided. The method includes receiving a signal having a size less than a first threshold value from a second communication device in a first interval within a first frame, transmitting a first signal to a third communication device in the first interval, and estimating a self-interference channel through which the self-interference signal is transmitted based on the signal received in the first interval and the first signal transmitted in the first interval. The self-interference signal is a signal transmitted by the first communication device and is received by the first communication device through the self-interference channel.

In accordance with an aspect of the present disclosure, a first communication device for removing a self-interference signal in a wireless communication system is provided. The first communication device includes a transceiver, a memory, and at least one processor configured to receive a signal having a size less than a first threshold value from a second communication device in a first interval within a first frame, transmit a first signal to a third communication device in the first interval, and estimate a self-interference channel through which the self-interference signal is transmitted based on the signal received in the first interval and the first signal transmitted in the first interval. The self-interference signal is a signal transmitted by the first communication device and is received by the first communication device through the self-interference channel.

BRIEF DESCRIPTION OF THE DRAWINGS

The above and other aspects, features and advantages of certain embodiments of the disclosure will be more apparent from the following detailed description taken in conjunction with the accompanying drawings, in which:

FIG. 14 is a diagram illustrating a transmission frame structure of a plurality of communication devices according to an orthogonal single slot allocation method in a multi-FD link environment, according to an embodiment;

FIG. 15 is a diagram illustrating a transmission frame structure of a plurality of communication devices according to a non-orthogonal single slot allocation method in a multi-FD link environment, according to an embodiment;

FIG. 16 is a diagram illustrating a transmission frame structure of a communication device according to a multi-slot pattern allocation method in a multi-FD link environment, according to an embodiment;

FIG. 17 is a diagram illustrating a transmission frame structure of a plurality of communication devices according to a random selection method in a multi-FD link environment, according to an embodiment;

FIG. 18 is a diagram illustrating a transmission frame structure of a plurality of communication devices according to a deterministic method in a multi-FD link environment, according to an embodiment;

FIG. 19 is a diagram illustrating a transmission frame structure of a plurality of communication devices determined by using a difference set in a multi-FD link environment, according to an embodiment; and FIG. 20 is a diagram illustrating a structure of a communication device, according to an embodiment.

DETAILED DESCRIPTION

Figure 1:
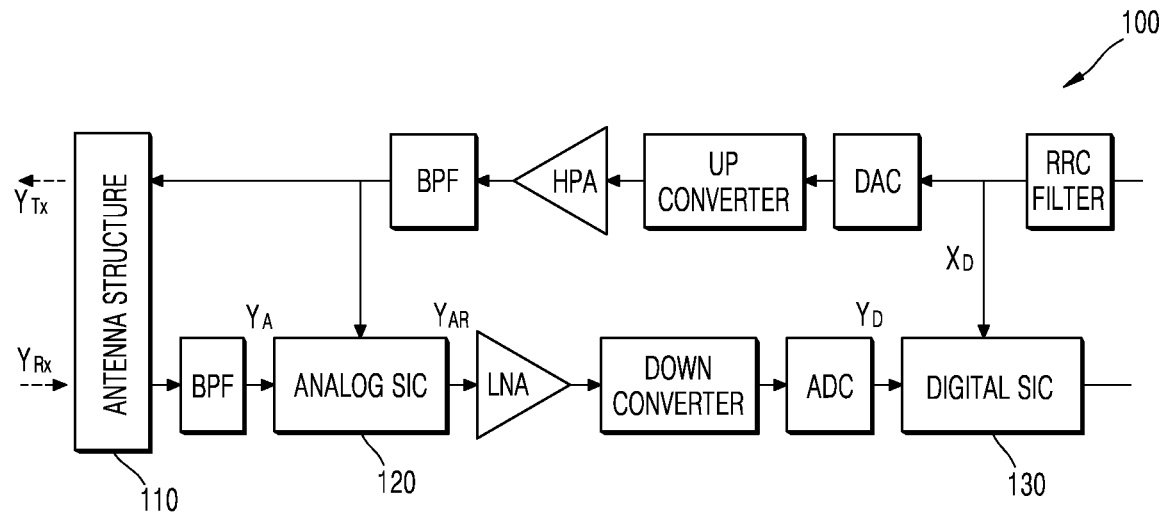
FIG. 1 is a diagram illustrating a structure of an FD communication device, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device indicates different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. Terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" indicates a person using an electronic device or a device (e.g., an artificial intelligence electronic device) using an electronic device.

It will be understood that each block of flowchart illustrations and combinations of blocks in the flowchart illustrations may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for implementing functions specified in the flowchart block or blocks. The computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the functions specified in the flowchart block or blocks. The computer program instructions may also be loaded onto a computer or other programmable data processing apparatus to cause a series of operational steps to be performed on the computer or other programmable apparatus to produce a computer implemented process, such that the instructions that are executed on the computer or other programmable apparatus provide steps for implementing the functions specified in the flowchart block or blocks.

In addition, each block of the flowchart illustrations may represent a module, segment, or portion of code, which includes one or more executable instructions for implementing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "~ unit", as used in the present embodiment of the disclosure, means, but is not limited to, a software or hardware component, such as FPGA or ASIC, which performs certain tasks. However, "~ unit" does not mean to be limited to software or hardware. The term "~ unit" may be configured to be in an addressable storage medium or configured to operate one or more processors. Thus, "~ unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and "~ units" may be combined into fewer components and "~ units" or further separated into additional components and "~ units". Further, the components and "~ units" may be implemented to operate one or more CPUs in a device or a secure multimedia card. Also, a unit may include one or more processors in an embodiment of the disclosure.

Examples of a terminal may include a user equipment (UE), a mobile station (MS), a cellular phone, a smartphone, a computer, and a multimedia system capable of performing a communication function.

In the disclosure, a controller may also be referred to as a processor.

In the disclosure, a layer (or a layer apparatus) may also be referred to as an entity.

In the disclosure, related well-known functions or configurations incorporated herein are not described in detail in the case where it is determined that they obscure the subject matter of the disclosure in unnecessary detail. Hereinafter, embodiments of the disclosure will be described with reference to the accompanying drawings.

Hereinafter, terms indicating a connection node, terms indicating network entities, terms indicating an interface between network entities, and terms indicating various pieces of identification information, as used in the following description, are exemplified for convenience of explanation. Accordingly, the disclosure is not limited to the terms to be described hereinafter, but other terms indicating objects having similar or identical technical meanings may be used.

Hereinafter, a BS is a subject that allocates resources to a terminal and may be at least one of a gNode B (gNB), an eNode B (eNB), a Node B (NB), a BS, a radio access unit, a BS controller, or a node on a network. Examples of a terminal may include a UE, an MS, a cellular phone, a smartphone, a computer, and a multimedia system capable of performing a communication function. The disclosure is not limited to the above examples.

Hereinafter, for convenience of explanation, terms and names that are defined in the 3rd generation partnership project long term evolution (3GPP LTE) standards are used in the disclosure. However, the disclosure is not limited to the above terms and names, and may also be applied to systems following other standards. In the disclosure, an eNB may be interchangeably used with a gNB for convenience of explanation. That is, a BS described as an eNB may refer to a gNB. Also, the term "terminals" may refer to not only mobile phones, NB-IoT devices, and sensors but also other wireless communication devices.

In particular, the disclosure may be applied to 3GPP new radio (NR) ($5^{th}$ generation (5G) mobile communication standard). Also, the disclosure may be applied to intelligent services (e.g., smart homes, smart buildings, smart cities, smart cars or connected cars, health care, digital education, retail business, and security and safety related services) based on 5G communication technology and IoT related technology. In the disclosure, an eNB may be interchangeably used with a gNB for convenience of explanation. That is, a BS described as an eNB may refer to a gNB. Also, the term "terminals" may refer to not only mobile phones, NB-IoT devices, and sensors but also other wireless communication devices.

FIG. 1 is a diagram illustrating a structure of an FD communication device, according to an embodiment.

The FD communication device 100 may be a wireless communication device that performs in-band FD communication by simultaneously transmitting/receiving a signal in the same frequency band. A digital domain self-interference cancellation method may be performed on a residual self-interference signal after analog domain self-interference cancellation. The FD communication device 100 may estimate a self-interference channel experienced by a transmission signal of a digital domain, may construct a signal similar to a self-interference signal by using a transmitted digital signal, and may remove the self-interference signal by subtracting the signal similar to the self-interference signal from a reception signal. When digital domain interference cancellation is successful, a final residual self-interference signal may be reduced to power of thermal noise or less.

The FD communication device 100 that performs nonlinear polynomial model-based self-interference cancellation may perform, before digital domain self-interference cancellation, propagation domain self-interference cancellation in an antenna structure 110 and may perform analog domain self-interference cancellation in an analog self-interference canceller 120. It is assumed that a sum of performance of the two methods removes noise of a power amplifier to a thermal noise level or less, and in some cases, the FD communication device 100 may perform only one of the propagation domain self-interference cancellation and the analog domain self-interference cancellation.

Polynomial model-based self-interference cancellation may be performed in a digital self-interference canceller 130. A digital domain reception signal $Y_D[n]$ of a receiver of the FD communication device 100 may be expressed, as in Equation (1).

$$Y_D[n]=Y_{DSI}[n]+Y_{des}[n]+z[n] \qquad (1)$$

In Equation (1), $Y_{DSI}$ is a digital domain self-interference signal, $Y_{des}$ is a desired signal, and $z[n]$ is noise.

When it is assumed that there are no noise and no desired signal, the reception signal $Y_D[n]$ may include only the digital domain self-interference signal $Y_{DSI}$, and may be expressed as a function of a digital transmission signal $X_D$, as in Equation (2).

$$Y_{DSI}[n]=f(X_{D,M_r})=f(X_D[n-M_r+1], \ldots, X_D[n]) \qquad (2)$$

The digital transmission signal $X_D$ may be a signal transmitted by a transmitter of the FD communication device 100. Equation (2) is a nonlinear function and may include operations in a transmitting end, a receiving end, and a wireless channel.

In Equation (2), $M_r$ denotes a memory length of a memory effect caused by a concatenation of the transmitting end, the receiving end, and the wireless channel, and $\underline{X}_{D,M_r}$ denotes a component $\underline{X}_D$ affecting an instantaneous output $Y_{DSI}[n]$ of a digital transmission signal vector $\{X_D[n-M_r+1], \ldots, X_D[n]\}$.

In order to approximate the nonlinear function $f$ of Equation (2), a Pth order polynomial model having a memory length of $M_m$ may be used. An approximation function $\hat{f}$ of the nonlinear function $\hat{f}$ of Equation (2) may be derived by estimating coefficients $Y_D$ from the reception signal $X_d$ and the transmission signal $\hat{h}_{p,m}$ of Equation (1). Estimation of a self-interference channel may be generally performed when there is no desired signal ($Y_{des}[n]=0$). Examples of a channel estimation method may include a least square (LS) method. Because it is very complex to estimate the coefficients $\hat{h}_{p,m}$ for all p and m at once, the coefficients $\hat{h}_{p,m}$ may be sequentially estimated from low p. The estimated coefficients $\hat{h}_{p,m}$ may be used as coefficients of a polynomial model of Equation (3).

$$\hat{Y}_{DSI}[n] = \hat{f}(\underline{X}_{D,M_m}) = \sum_{\substack{p=1 \\ odd}}^{P} \sum_{m=0}^{M_m-1} \hat{h}_{p,m}[n] X_D[n-m] |X_D[n-m]|^{p-1} \quad (3)$$

The approximation function $\hat{f}$ may be a function representing an estimated self-interference channel, and a self-interference channel may be estimated based on a transmission signal and a reception signal of the FD communication device 100. Also, the approximation function $X_D$ may be estimated through machine learning having the transmission signal $Y_D$ and the reception signal $\hat{f}$ as inputs. The reception signal used by the FD communication device 100 for the self-interference channel may be a signal not including a desired signal (i.e., when a signal is not received from the other communication device or when a signal is received with low power).

The FD communication device 100 may remove a self-interference signal from the reception signal by using the approximation function $\hat{f}$ obtained through channel estimation. The FD communication device 100 may generate a self-interference signal estimated value $\underline{X}_{D,M_m}$ from $\hat{Y}_{DSI}$, and may perform a polynomial-based self-interference cancellation method by removing the self-interference signal estimated value $Y_D$ from the digital domain reception signal $\hat{Y}_{DSI}$. Self-interference cancellation may be performed, as in Equation (4).

$$Y_{DR}[n] = Y_D[n] - \hat{Y}_{DSI}[n] = Y_{DRSI}[n] + Y_{des}[n] \quad (4)$$

A signal $Y_{DR}[n]$ remaining after the self-interference signal is removed may include the desired signal $Y_{des}[n]$ and a residual interference signal $Y_{DRSI}[n]$ including noise. When $Y_{des}[n]=0$ is set, residual interference power may be easily measured from the signal $Y_{DR}[n]$ remaining after the self-interference signal is removed. The FD communication device 100 may remove the self-interference signal based on the self-interference signal estimated value, when the desired signal is not 0 ($Y_{des}[n] \neq 0$).

Figure 2:
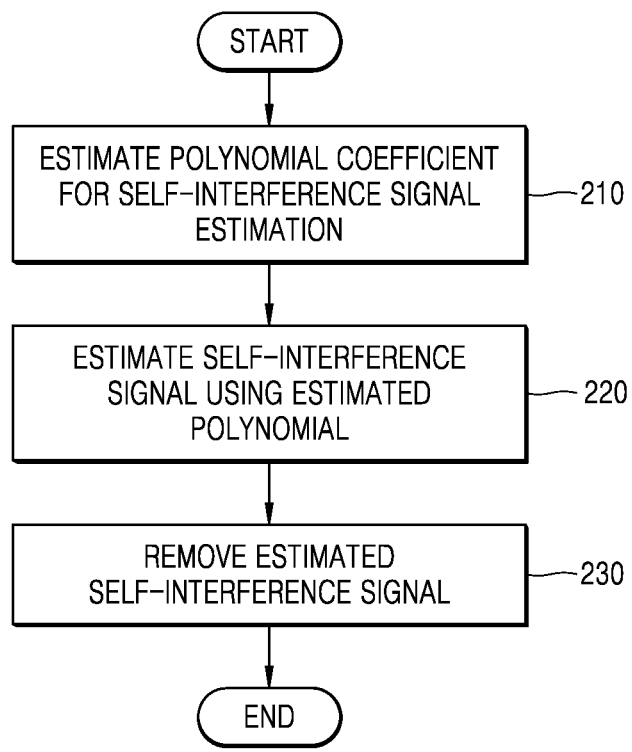
FIG. 2 is a flowchart illustrating a nonlinear polynomial model-based digital self-interference cancellation procedure, according to an embodiment.

FIG. 2 is a flowchart illustrating a nonlinear polynomial model-based digital self-interference cancellation procedure, according to an embodiment.

At step 210, the FD communication device 100 may estimate a coefficient $Y_{DSI}$ to be used in a polynomial model (Equation (3)) by using a reception signal $X_D$ and a digital transmission signal $\hat{h}_{p,m}$ of the digital self-interference canceller 130.

At step 220, the FD communication device 100 may calculate an estimated self-interference signal $\hat{h}_{p,m}$ as in Equation (1) by using the estimated coefficient $X_D$ and the digital transmission signal $\hat{Y}_{DSI}$.

At step 230, the FD communication device 100 may output $Y_{DSI}$ after removing the estimated self-interference signal $\hat{Y}_{DSI}$ from the reception signal $Y_{DRSI}$ of a digital domain.

Estimation of the coefficient $\hat{h}_{p,m}$ may be intermittently updated when there is little change in a channel.

A self-interference cancellation method of an existing FD communication system has been developed mainly assuming a time-invariant channel. When a coefficient of a self-interference channel model is estimated once in a situation where a channel does not change or changes very slowly, the coefficient may be used for self-interference cancellation for a long time. Hence, a receiver may estimate a self-interference channel in a non-operating environment or a situation with no desired signal, and may use an estimation result for interference cancellation. Here, a desired signal may be a signal which a communication device is to receive (expects to receive) from another communication device.

However, in a mobile communication environment, although an arrangement of transmitting/receiving antennas is fixed, a channel may rapidly change due to reflection from a surrounding object. In order to perform self-interference cancellation in response to this channel change, self-interference channel estimation may also need to be frequently performed. This may mean that channel estimation has to be performed in an FD communication operating environment. However, when self-interference channel estimation is performed by using an existing FD communication system in a situation where a self-interference signal and a desired signal are simultaneously received, the desired signal may act as noise in the self-interference channel estimation. Accordingly, self-interference channel estimation performance may be degraded, thereby reducing self-interference cancellation performance.

When a self-interference channel is estimated in a process of actual FD communication, a desired signal may act as noise and may limit self-interference cancellation performance. Self-interference channel estimation performance may be improved by setting an interval and a length in which each communication device of two communication devices that perform FD communication operates in HD or quasi-HD to achieve a desired SINR.

The disclosure provides a method of precisely performing self-interference channel estimation by setting an interval in which an operation is performed in HD or quasi-HD within a transmission frame to improve the accuracy of self-interference channel estimation in a single FD link. Also, the disclosure provides a method of optimizing a length of an HD or quasi-HD interval in terms of data rate.

Hereinafter, an interval in which an operation is performed in HD or quasi-HD will be referred to as a quasi-HD interval. The quasi-HD interval that is an interval for self-interference channel estimation may include a zero or low-power transmission interval and a high-power transmission interval. A zero or low-power transmission interval may refer to an interval in which a communication device transmits a signal with a size less than a certain value (e.g., a threshold value), and a high-power transmission interval may refer to an interval in which the communication device transmits a signal with a size greater than the certain value. In a high-power transmission interval, a communication device may transmit a desired signal of another communication device (i.e., a signal expected to be received by the other communication device) to the other communication device.

An FD communication device may find an interval in which power of an external signal (e.g., a desired signal) acting as interference in self-interference estimation is low in a high-power transmission interval within a quasi-HD interval and may perform self-interference channel estimation. The FD communication device in a zero or low-power transmission interval may transmit a signal with low power so that another adjacent FD communication device performs self-interference channel estimation.

Also, an FD interval that is an interval other than a quasi-HD interval for self-interference channel estimation in a transmission frame may refer to an interval in which a signal is transmitted with high power. An FD communication device may transmit a signal desired to be received by another communication device (i.e., a desired signal of the other communication device) with high power in an FD interval.

A transmitter may appropriately distribute an interval in which transmission is performed and an interval in which transmission is not performed within a frame. A receiver may estimate a self-interference channel in an interval in which there is no desired signal (or power of a desired signal is low), thereby improving self-interference channel estimation performance and self-interference cancellation performance.

Also, the disclosure provides a method of setting a quasi-HD interval for achieving a desired SINR of each communication device for a plurality of communication devices that perform FD communication in a multi-communication device environment extended from a single FD link scenario. In a multi-communication device FD network condition, for a plurality of communication devices that perform FD communication, a BS may schedule a zero or low-power transmission interval within an interval in which each communication device operates in HD or quasi-HD to achieve an SINR desired by each communication device. The disclosure provides a method by which multiple users may effectively schedule transmission/reception by using an HD or quasi-HD interval.

In an FD communication method of simultaneously performing transmission and reception in the same frequency band, a signal propagated from its own transmitting antenna may be received by its own receiving antenna. When a transmitting antenna and a receiving antenna are separated from each other, a self-interference signal may be received through a path through which a signal is directly propagated from the transmitting antenna to the receiving antennal and a path through which a signal propagated from the transmitting antenna is reflected from an external object and is received. When both transmission and reception are performed by using one physical antenna and a signal transmission path is separated by using a circulator, a self-interference signal may be received through a current leakage path inside the circulator, a reflection path formed inside a transmitting/receiving antenna, and a signal reflection path formed outside a transceiver. Because a self-interference signal has a signal source close to a receiving antenna and thus occupies a largest power ratio among signals received through the receiving antenna, the self-interference signal may obstruct a desired signal from being decoded. Accordingly, the self-interference signal has to be removed in order to completely decode the desired signal.

In an FD communication, a self-interference cancellation method includes of estimating and removing a self-interference signal by using information of its own transmission signal, and may be performed in a propagation domain, an analog domain, and a digital domain. A propagation domain self-interference cancellation method includes of enabling a self-interference signal to be attenuated or cancelled and received by a receiving antenna through an antenna design or arrangement without additional signal processing, and an analog domain self-interference cancellation method includes of estimating and removing a received self-interference signal by using a signal propagated from a transmitting antenna of a transmitter. A digital domain self-interference cancellation method includes of estimating and removing a residual self-interference signal after analog domain self-interference signal cancellation by using a digital signal of a transmitter, and may reduce power of the residual self-interference signal to a power level of thermal noise when there is no external interference.

In conventional digital domain interference cancellation, because a transmitted signal may be known, a self-interference channel may be estimated based on a transmission signal. A self-interference signal may be removed by using the estimated channel. In this case, when a desired signal is received along with the self-interference signal, self-interference channel estimation performance may be degraded due to the desired signal. Accordingly, a digital domain self-interference cancellation method may assume an operation in a static channel. Through the above process, a self-interference channel may be estimated when there is no desired signal based on a transmission signal before FD communication, and self-interference cancellation may be performed by using pre-estimated self-interference channel information during the FD communication.

In channel estimation with no desired signal, precise channel estimation may be performed, and thus a self-interference signal may be removed to a level of thermal noise through the channel estimation with no desired signal. However, because there is no desired signal in this case, it may be meaningful only when interference cancellation performance is evaluated. In this case, an output signal $Y_{DR}$ of a digital self-interference canceller may be expressed, as in Equation (5).

$$Y_{DR}=Y_{DSI}-\hat{Y}_{DSI}+N_t \quad (5)$$

In Equation (5), $Y_{DSI}$ denotes a received digital domain self-interference signal, $\hat{Y}_{DSI}$ denotes an estimated self-interference signal, and $N_t$ denotes thermal noise.

In channel estimation with a desired signal, the desired signal may act as noise in a self-interference channel estimation process, and thus channel estimation performance may be reduced. Accordingly, it may be difficult to remove a self-interference signal to a level of thermal noise ($N_t$) due to a channel estimation error. The output signal $Y_{DR}$ of the digital self-interference canceller may be expressed, as in Equation (6).

$$Y_{DR}=Y_{des}+Y_{DSI}-\hat{Y}_{DSI}'+N_t \quad (6)$$

In this case, a self-interference canceller output signal $Y_{DRSI}$ may be a signal on which self-interference cancellation has not been sufficiently performed, and a signal larger than thermal noise may be output from the self-interference canceller, as in Equation (7).

$$Y_{DRSI}=Y_{DSI}-\hat{Y}_{DSI}'+N_t>>N_t \quad (7)$$

In Equations (6) and (7), $Y_{DSI}$ denotes a received digital domain self-interference signal, $N_t$ denotes thermal noise, $Y_{des}$ denotes a desired signal, and $\hat{Y}_{DSI}'$ denotes an estimated self-interfere signal in an environment with a desired signal.

When there also exists an external interference signal $I_{out}$, an output signal of the digital self-interference canceller may be expressed, as in Equation (8).

$$Y_{DR}=Y_{des}+Y_{DSI}-\hat{Y}_{DSI}'+N_t+I_{out} \quad (8)$$

When there exists the external interference signal, self-interference cancellation performance may be degraded due to the desired signal and the external interference signal, and residual interference may be greater than thermal noise ($N_t$) and the external interference signal $I_{out}$, as in Equation (9).

$$Y_{DRSI}=Y_{DSI}-\hat{Y}_{DSI}'+N_t+I_{out}>>N_t+I_{out} \quad (9)$$

In Equations (8) and (9), $Y_{DSI}$ denotes a self-interference signal, $N_t$ denotes thermal noise, $Y_{des}$ denotes a desired signal, and $\hat{Y}_{DSI}'$ denotes an estimated self-interference signal in an environment with a desired signal. A post-SINR at a receiving end may be defined as in Equation (8) through Equation (10).

$$\text{Post } SINR = \frac{E\{\|Y_{des}\|^2\}}{E\{\|Y_{DSI}-\hat{Y}_{DSI}'\|^2\}+E\{\|N_t\|^2\}+E\{\|I_{out}\|^2\}} \quad (10)$$

In Equation (10), $I_{out}$ denotes an external interference signal in an environment with external interference. A post-SINR may refer to an SINR when a self-interference signal is removed from a receiving signal during FD communication.

When a self-interference signal is not sufficiently removed during FD communication in a situation with a desired signal, a post-SINR of a receiver may be reduced. In order to increase the throughput of a network, a post-SINR of a received desired signal has to be high. To this end, it may be necessary to perform high-performance self-interference cancellation through precise self-interference channel estimation. In order to precisely perform self-interference channel estimation, it may be necessary to estimate a self-interference channel by avoiding an external interference signal ($Y_{des}$) and a desired signal ($I_{out}$) that is an external signal acting as noise in channel estimation.

Figure 3:
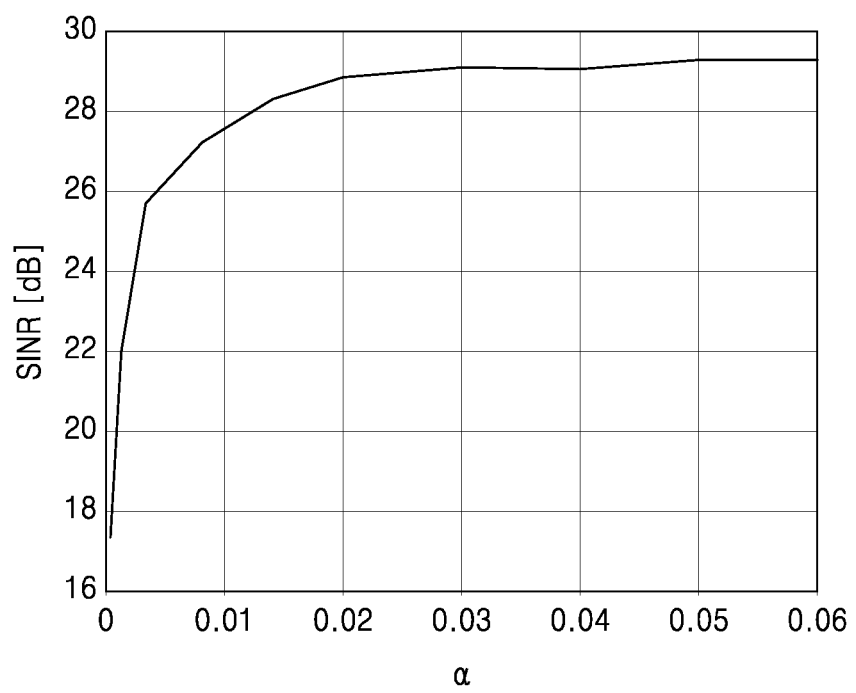
FIG. 3 is a graph illustrating a signal-to-interference-plus-noise ratio (SINR) after self-interference cancellation according to a length ratio of an interval in which power of a desired signal is low, according to an embodiment.

FIG. 3 is a graph illustrating an SINR after self-interference cancellation according to a length ratio of an interval in which power of a desired signal is low, according to an embodiment.

The graph of FIG. 3 shows an experimental result in an environment where power of a desired signal is about −50 dBm and power of an external interference signal is about −80 dBm. A length ratio ($\alpha$) of an interval in which power of a desired signal is low may be defined as a value obtained by dividing a length of the interval in which the power of the desired signal is low by a length of one transmission frame. In this case, one transmission frame may include 10000 symbols.

Although FIG. 3 illustrates that communication is performed by using a signal carrier signal, scheduling may be performed in units of OFDM symbols even in the case of a multi-carrier signal such as OFDM and the graph of FIG. 3 may be obtained even when communication is performed by using the multi-carrier signal.

Referring to FIG. 3, although a post-SINR increases as $\alpha$ increases in an interval where $\alpha$ is low, the post-SINR may be saturated when reaches a specific $\alpha$ value. In this case, as a $\alpha$ value increases, a post-SINR value may increase but a transmission rate-loss may also increase, which is a trade-off. Accordingly, it may be necessary to select an appropriate $\alpha$ value that makes a compromise between a transmission rate loss and a post-SINR in a given environment.

Figure 4:
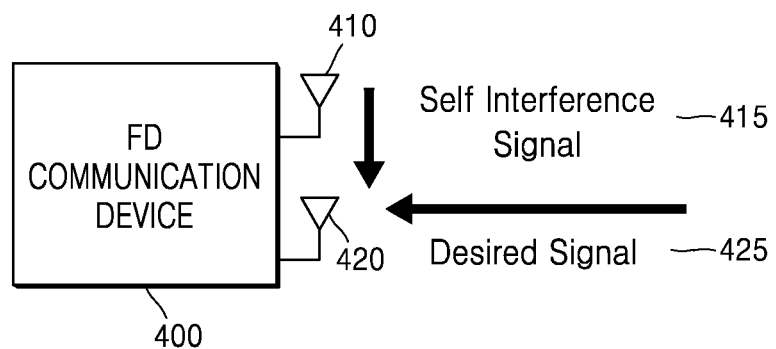
FIG. 4 is a diagram illustrating a situation where an FD communication device transmits/receives a signal, according to an embodiment.

FIG. 4 is a diagram illustrating a situation where an FD communication device transmits/receives a signal, according to an embodiment.

Referring to FIG. 4, a self-interference signal 415 transmitted from a transmitting antenna 410 of an FD communication device 400 may be received by a receiving antenna 420. In this case, the FD communication device 400 may estimate a self-interference channel for self-interference cancellation, and in channel estimation in a situation with a desired signal 425 to be received, the desired signal may act as noise in self-interference channel estimation, thereby reducing channel estimation performance. Accordingly, the disclosure provides a method of setting an HD or quasi-HD operation interval and a length in a transmission frame for accurate self-interference channel estimation, when there is a desired signal during FD communication.

In detail, a zero or low-power transmission interval (in which power of a transmission signal is very low or close to 0) may be set for each communication device through scheduling of an FD communication signal. Each communication device may estimate a self-interference channel based on a transmission signal, in a zero or low-power transmission interval (in which power of a desired signal is low) of an FD communication partner.

The FD communication device 400 may remove a self-interference signal in an interval where there is a desired signal by using estimated self-interference channel information. In this case, a length of an interval in which power of a desired signal is low may be determined based on whether a desired SINR may be achieved in an interval in which power of a desired signal is high. That is, in order for the FD communication device 400 to achieve a desired SINR in an FD interval, a length of an interval in which power of a transmission signal of an FD communication partner is low may be determined. Also, when there is an external interference signal, a length of an interval in which power of a desired signal is low may also be determined in consideration of power of the external interference signal.

Figure 5:
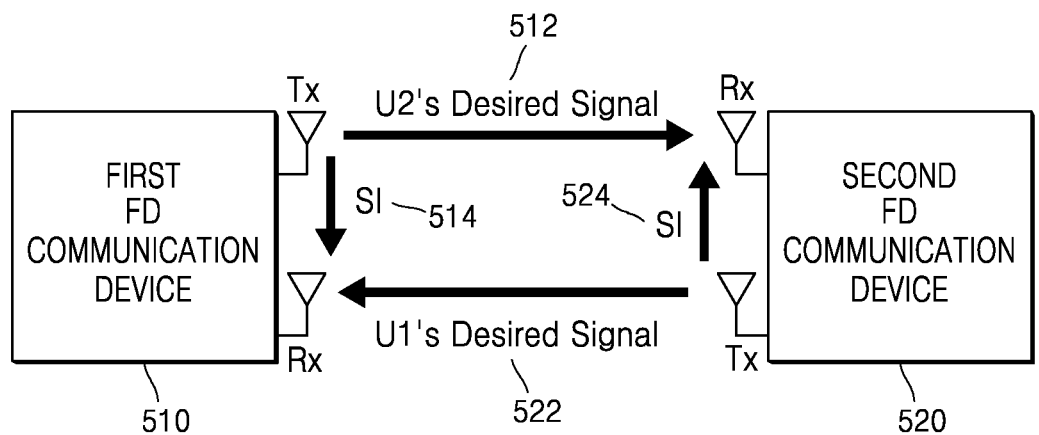
FIG. 5 is a diagram illustrating a situation where a first FD communication device and a second FD communication device transmit/receive a signal in a single FD link, according to an embodiment.

FIG. 5 is a diagram illustrating a situation where a first FD communication device and a second FD communication device transmit/receive a signal in a single FD link, according to an embodiment.

Referring to FIG. 5, a first FD communication device 510 and a second FD communication device 520 may transmit/receive a first signal 512 and a second signal 522. The first signal 512 transmitted by the first FD communication device 510 to the second FD communication device 520 may be a desired signal of the second FD communication device 520, and the second signal 522 transmitted by the second FD communication device 520 to the first FD communication device 510 may be a desired signal of the first FD communication device 510.

Not only the second signal 522 received from the second FD communication device 520 but also a first self-interference signal 514 through signal transmission of a transmitting end may be received by a receiving end of the first FD communication device 510. Not only the first signal 512 received from the first FD communication device 510 but also a second self-interference signal 524 through signal transmission of a transmitting end may be received by a receiving end of the second FD communication device 520.

In this case, the first FD communication device 510 and the second FD communication device 520 need to remove the first and second self-interference signals 514 and 524, and the first signal 512 and the second signal 514 may act as noise in self-interference channel estimation for self-interference cancellation. Accordingly, for accurate self-interference channel estimation for self-interference cancellation, it may be necessary to set an HD or quasi-HD interval and a length thereof for a transmission frame of the first FD communication device 510 and a transmission frame of the second FD communication device 520.

A BS may determine a frame structure of each of the first and second FD communication devices 510 and 520 that perform FD communication in a single FD link. The BS may set a length of a quasi-HD interface required for self-interference channel estimation of the other FD communication device, in consideration of a size of a desired signal of each FD communication device, a size of an external interference signal, and a size of a self-interference signal.

In a zero or low-power transmission interval in a quasi-HD interval, a size of a desired signal may be set to a small value so that the desired signal does not affect self-interference channel estimation, and in a high-power transmission interval in the quasi-HD interval, a self-interference channel coefficient estimated through self-interference channel estimation may be used for self-interference cancellation of an FD interval.

Hereinafter, a method of determining and optimizing a length of a quasi-HD interval in a single FD link will be described. First, a method of determining and optimizing a length of a quasi-HD interval when a quasi-HD frame including the quasi-HD interval is used for channel estimation for each frame will be described. Next, a method of determining a length of a quasi-HD interval when a frame including the quasi-HD interval is periodically used will be described.

Figure 6:
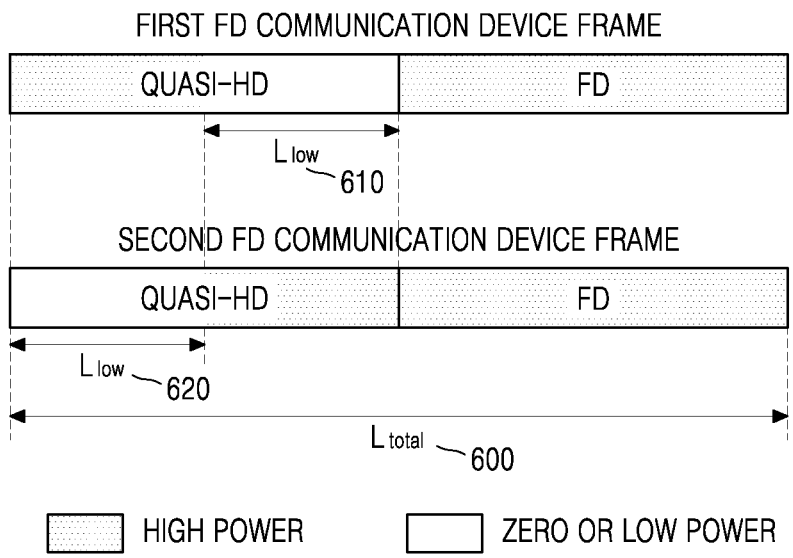
FIG. 6 is a diagram illustrating a transmission frame structure of a first communication device and a second communication device for transmitting/receiving a signal through a symmetric channel in a single FD link environment, according to an embodiment.

FIG. 6 is a diagram illustrating a transmission frame structure of a first communication device and a second communication device for transmitting/receiving a signal through a symmetric channel in a single FD link environment, according to an embodiment.

When power of a desired signal and power of an external interference signal of two FD communication devices (first FD communication device and second FD communication device) in a single FD link are respectively $(S_1,I_1),(S_2,I_2)$ and channels between the two FD communication devices are symmetric $(S_1=S_2,I_1=I_2)$, a transmission frame structure of the two FD communication devices may be as shown in FIG. 6.

In this case, a length ratio α of each of zero or low-power transmission intervals 610 and 620 with respect to a length of the transmission frame 600 may be defined as a value obtained by dividing a length $L_{low}$ of an interval in which power of a transmission signal is less than a certain value (or close to 0) by a total length $L_{total}$ of a transmission frame, as in Equation (11).

$$\alpha = \frac{L_{low}}{L_{total}} \quad (11)$$

In this case, as an α value increases, a post-SINR value may increase but a transmission rate loss may also increase, which is a trade-off as described above. Accordingly, it may be necessary to select an appropriate α value that makes a compromise between a transmission rate loss and a post-SINR in a given environment.

Spectral efficiency may be used to optimize an α value. Assuming that power of a signal transmitted in a zero or low-power transmission interval included in a quasi-HD interval is very low and close to 0, when a length ratio of each of the zero or low-power transmission intervals 610 and 620 of two FD communication devices with respect to the transmission frame 600 in a symmetric channel environment is α, a sum of spectral efficiency of the two FD communication devices may be expressed, as in Equation (12).

$$\text{Spectral efficiency}=2\cdot(1-\alpha)\cdot\log_2(1+\text{SINR}(\alpha)) \quad (12)$$

In Equation (12), SINR(α) denotes a post-SINR value when a length ratio of an interval in which power of a transmission signal is less than a certain value (or close to 0) is α. In this case, an SINR may be affected by the performance of a self-interference cancellation method, and SINR (α) may vary according to the self-interference cancellation method and a channel estimation method.

A value of Equation (12) may be maximized when a α value is a specific value. An α value for maximizing a value of Equation (12) may be defined as $\alpha_{opt}$, and may be expressed, as in Equation (13).

$$\alpha_{opt} = \underset{\alpha}{\mathrm{argmax}}\ (2\cdot(1-\alpha)\cdot\log_2(1+SINR(\alpha))) \quad (13)$$

Figure 7:
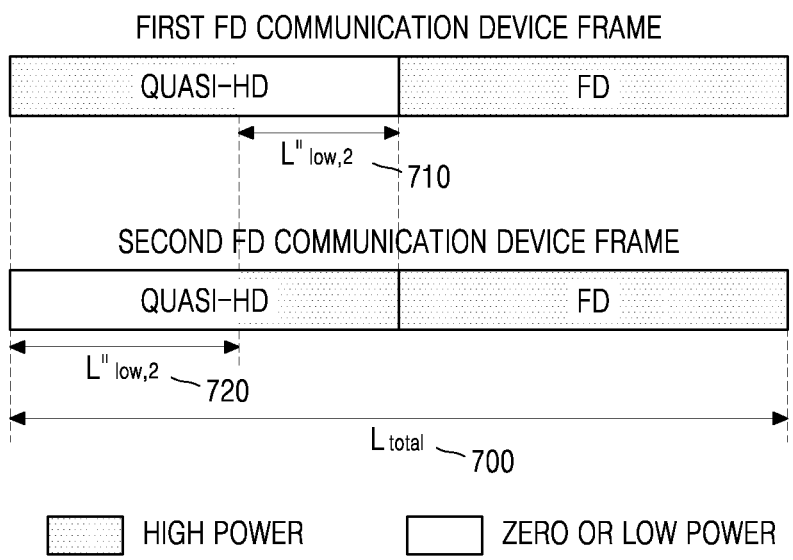
FIG. 7 is a diagram illustrating a transmission frame structure of a first communication device and a second communication device for transmitting/receiving a signal through an asymmetric channel in a single FD link environment, according to an embodiment.

FIG. 7 is a diagram illustrating a transmission frame structure of a first communication device and a second communication device for transmitting/receiving a signal through an asymmetric channel in a single FD link environment, according to an embodiment.

When the power of a desired signal and the power of an external interference signal of two FD communication devices (first FD communication device and second FD communication device) in a single FD link are respectively $(S_1,I_1),(S_2,I_2)$ and channels between the two FD communication devices are asymmetric $(S_1 \neq S_2, I_1 \neq I_2)$, a frame structure may be as shown in FIG. 7. In this case, a position of a quasi-HD interval in a frame does not necessarily need to be a frontmost position, and may be freely located in the frame.

Lengths of quasi-HD intervals of the first FD communication device and the second FD communication device used for channel estimation may be the same. However, zero or low-power transmission intervals 710 and 720 included in the quasi-HD intervals may be different from each other in a transmission frame of the first FD communication device and a transmission frame of the second FD communication device. Length ratios α of the zero or low-power transmission intervals 710 and 720 of the first FD communication device and the second FD communication device may be different from each other, and are respectively defined as $\alpha_1$ and $\alpha_2$. When a total length of a transmission frame 700 is $L_{total}$, $\alpha_1$ may be defined, as in Equation (14), and $\alpha_2$ may be defined, as in Equation (15).

$$\alpha_1 = \frac{L'_{low,U1}}{L_{total}} \quad (14)$$

$$\alpha_2 = \frac{L''_{low,U2}}{L_{total}} \quad (15)$$

There may be a $(\alpha_1, \alpha_2)$ value for maximizing a sum of spectral efficiency of the two FD communication devices even in an asymmetric channel environment like in a symmetric channel environment, and the $(\alpha_1, \alpha_2)$ value may be defined as $(\alpha_{opt}^1, \alpha_{opt}^2)$. $(\alpha_{opt}^1, \alpha_{opt}^2)$ may be defined, as in Equation (16).

$$(\alpha_{opt}^1, \alpha_{opt}^2) = \underset{(\alpha_1,\alpha_2)}{\mathrm{argmax}} \left( (1-\alpha_1) \cdot \log_2(1 + SINR_1(\alpha_1)) + (1-\alpha_2) \cdot \log_2(1 + SINR_2(\alpha_2)) \right) \quad (16)$$

In Equation (16), $SINR_i(\alpha_i)$ denotes a post-SINR value when a length ratio of a quasi-HD interval of an $i^{th}$ FD communication device is $\alpha_i$ ($i \in \{1, 2\}$).

Figure 8:
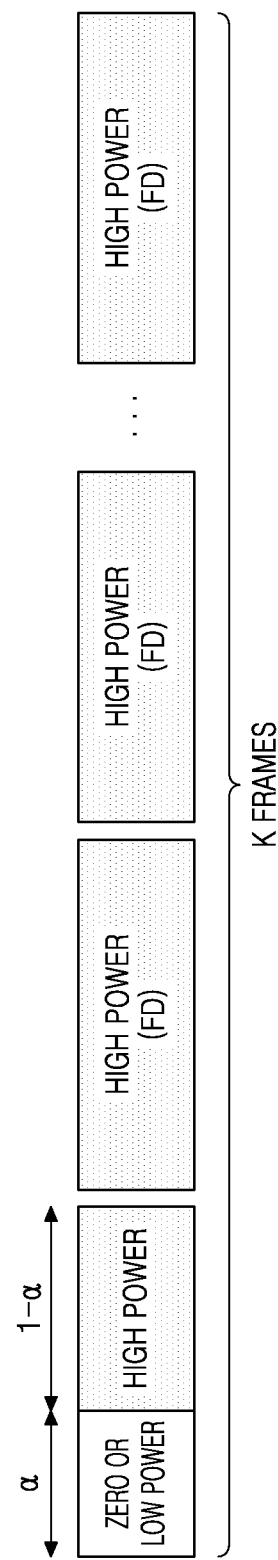
FIG. 8 is a diagram illustrating a plurality of transmission frame structures of FD communication devices in a single FD link environment, according to an embodiment.

FIG. 8 is a diagram illustrating a plurality of transmission frame structures of FD communication devices in a single FD link environment, according to an embodiment.

In a situation where two FD communication devices perform FD communication in a single FD link, when the two FD communication devices transmit/receive K frames, a quasi-HD interval may be allocated to only some of the K frames. When a quasi-HD frame including a quasi-HD interval is periodically allocated for every K frames, a zero or low-power signal transmission interval ratio $\alpha$ may be optimized as follows.

Referring to FIG. 8, a quasi-HD interval may be included in one frame for every K frames for self-interference cancellation.

Only one of the K frames may include a quasi-HD interval, and remaining (K−1) frames may not perform self-interference channel estimation through a quasi-HD interval. In this case, average spectral efficiency of all frames may be calculated, as in Equation (17).

$$\text{Average spectral efficiency} = \frac{(1-\alpha)\log_2(1+SINR(\alpha)) + (K-1)\log_2(1+SINR(\alpha))}{K} \quad (17)$$

A zero or low-power transmission interval ratio for optimizing average spectral efficiency of all frames in a symmetric channel environment may be calculated, as in Equation (18).

$$\alpha_{opt} = \underset{\alpha}{\mathrm{argmax}} \left\{ 2 \cdot \frac{K-\alpha}{K} \cdot \log_2(1+SINR(\alpha)) \right\} \quad (18)$$

A method of optimizing average spectral efficiency of all frames in an asymmetric channel environment may be as follows. For each FD communication device, when one of K transmission frames includes a quasi-HD interval and zero or low-power signal transmission ratios $\alpha$ for the frame are respectively $\alpha_1$ and $\alpha_2$, a sum of spectral efficiency of two FD communication devices may be calculated, as in Equation (19).

$$\text{Average spectral efficiency} = \frac{(K-\alpha_1)\log_2(1+SINR(\alpha_1))}{K} + \frac{(K-\alpha_2)\log_2(1+SINR(\alpha_2))}{K} \quad (19)$$

When a zero or low-power signal transmission interval ratio of each FD communication device in a multi-FD communication device asymmetric channel environment is $\alpha_i$ ($i \in \{1, 2, \ldots, N\}$), a sum of spectral efficiency of N FD communication devices may be expressed, as in Equation (20).

$$\text{Average spectral efficiency} = \sum_{i=1}^{N} \frac{(K-\alpha_i)}{K} \log_2(1+SINR(\alpha_i)) \quad (20)$$

Figure 9:
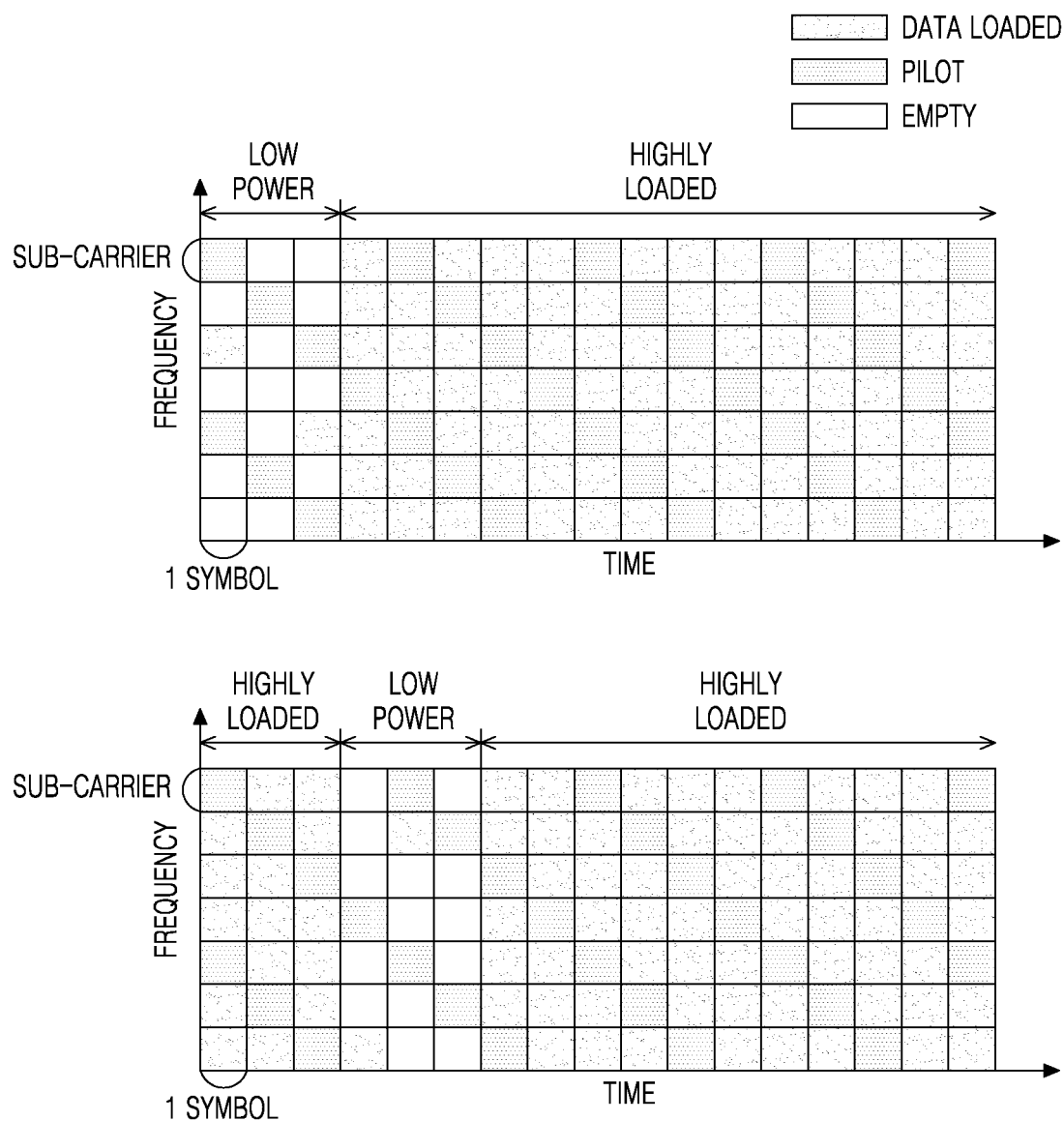
FIG. 9 is a diagram illustrating an orthogonal frequency-division multiplexing (OFDM)-based transmission frame structure of a first FD communication device and a second FD communication device in a single FD link environment, according to an embodiment.

FIG. 9 is a diagram illustrating an OFDM-based transmission frame structure of a first FD communication device and a second FD communication device in a single FD link environment, according to an embodiment.

Referring to FIG. 9, the first FD communication device and the second FD communication device may reduce transmission power by transmitting data on only some of a plurality of frequency carriers. Accordingly, a higher data rate than that of a method of transmitting all signals with low power in a zero or low-power signal transmission interval within a quasi-HD interval may be achieved.

Figure 10:
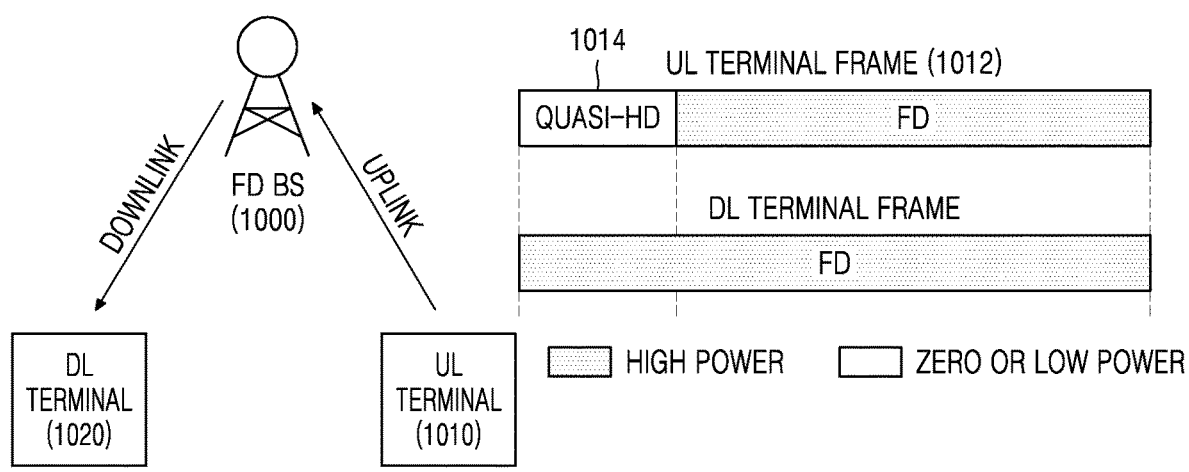
FIG. 10 is a diagram illustrating scheduling for self-interference channel estimation when one uplink (UL) terminal and one downlink (DL) terminal exist for a base station (BS) performing FD communication, according to an embodiment.

FIG. 10 is a diagram illustrating scheduling for self-interference channel estimation when one UL terminal and one DL terminal exist for a BS performing FD communication, according to an embodiment.

Referring to FIG. 10, a UL terminal 1010 may transmit a signal with high power to a BS 1000 only in a part of an uplink transmission frame 1012, and the BS 1000 may always transmit a signal with high power from a downlink transmission frame 1002 to a DL terminal 1020. The BS 1000 may simultaneously receive a signal from the UL terminal 1010 in the same frequency band and may transmit a signal to the DL terminal 1020.

In this case, the BS 1000 may perform self-interference channel estimation in an interval in which a size of a received UL signal is less than a certain value (or close to 0).

A length of the interval (zero or low-power interval) in which a size of a UL signal received by the BS 1000 is less than the certain value (or close to 0) may be determined to be a length for maximizing spectral efficiency as described with reference to FIG. 6. For example, a length of the interval in which a size of a UL signal is less than a certain value (or close to 0) to maximize a sum of spectral efficiency of a reception frame (i.e., an uplink transmission frame to the UL terminal 1010) and a transmission frame (i.e., a downlink transmission frame to the DL terminal 1020) of the BS 1000 may be determined to be a length for maximizing spectral efficiency as described with reference to FIG. 6. A sum of UL and DL spectral efficiency may be calculated based on a ratio ($\alpha$) between a length of a zero or low-power interval and a total length of an uplink transmission frame, and the length of the zero or low-power interval may be determined by calculating $\alpha$ for maximizing a sum of UL and DL spectral efficiency.

Figure 11:
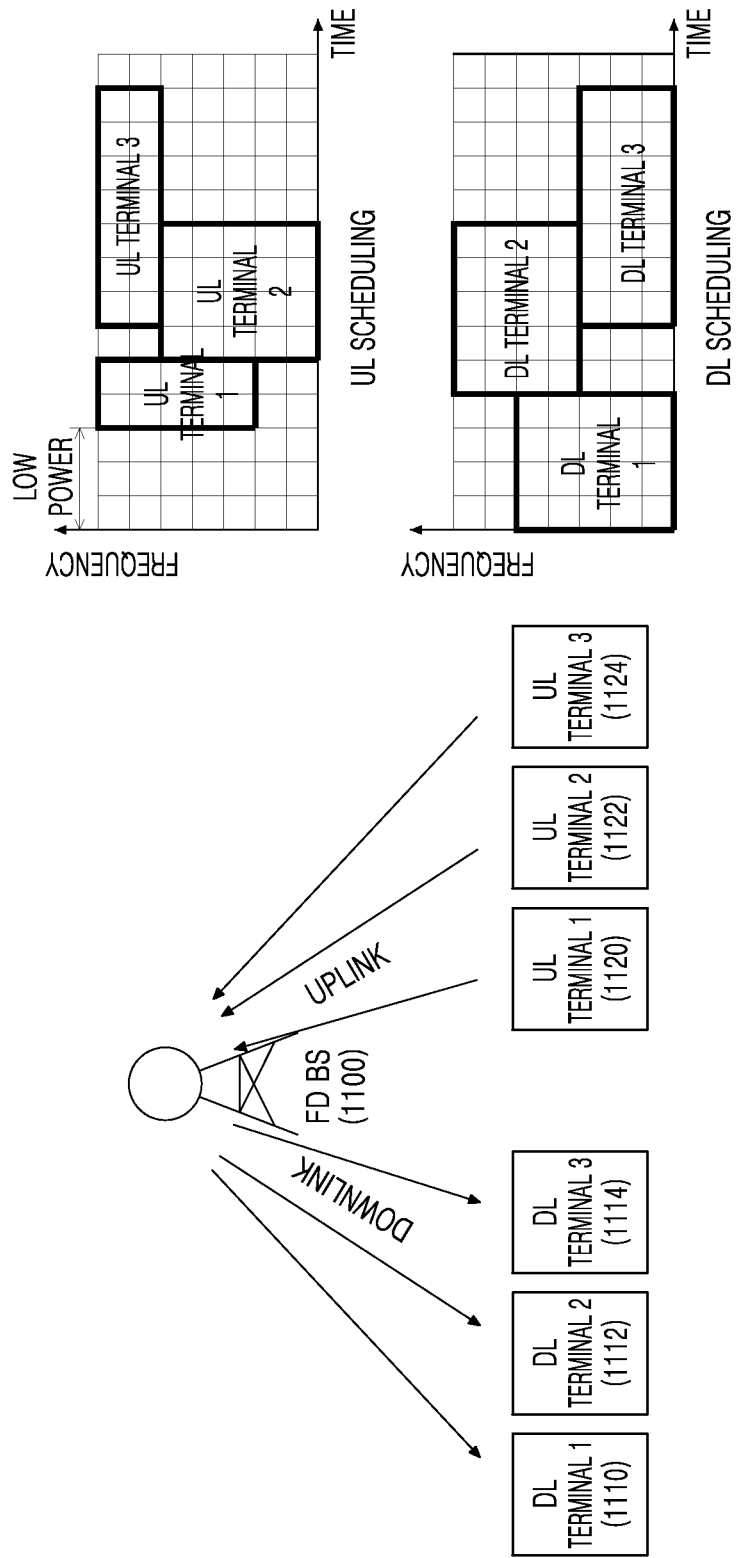
FIG. 11 is a diagram illustrating an example where a BS performs scheduling for self-interference channel estimation when a plurality of UL terminals and a plurality of DL terminals exist for the BS performing FD communication, according to an embodiment.

FIG. 11 is a diagram illustrating an example where a BS performs scheduling for self-interference channel estimation when a plurality of UL terminals and a plurality of DL terminals exist for the BS performing FD communication, according to an embodiment.

Referring to FIG. 11, a BS 1100 may always transmit a signal with high power to DL terminals 1110, 1112, and 1114, and UL terminals 1120, 1122, and 1124 may transmit a signal with high power to the BS 1100 only in a part of a transmission frame.

In this case, the BS 1100 that needs to perform channel estimation for self-interference signal cancellation may estimate a self-interference channel of a DL in an interval in which a size of a received UL signal is less than a certain value (or close to 0), that is, in a situation with little interference.

Figure 12:
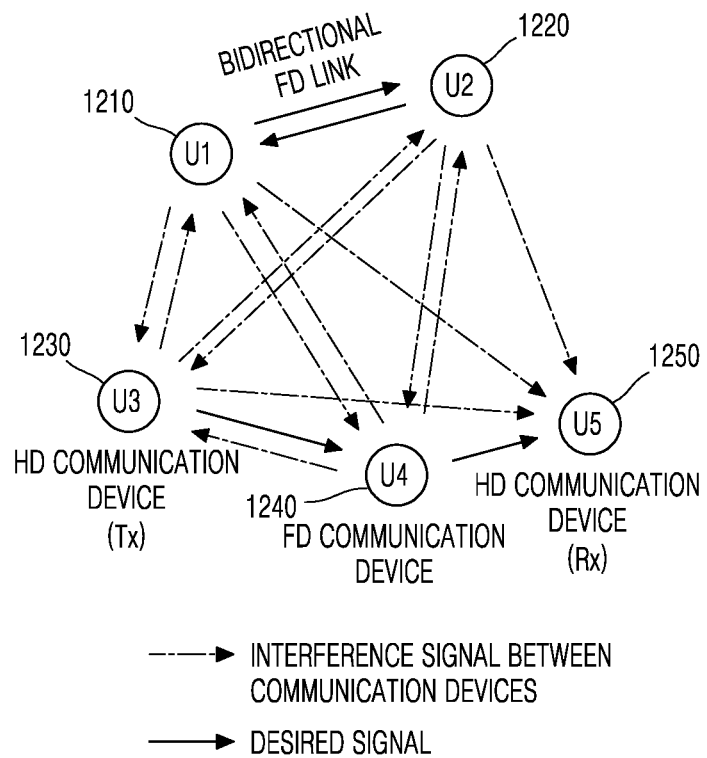
FIG. 12 is a diagram illustrating a situation where a plurality of communication devices transmit/receive a signal in a multi-FD link environment, according to an embodiment.

FIG. 12 is a diagram illustrating a situation where a plurality of communication devices transmit/receive a signal in a multi-FD link environment, according to an embodiment.

Referring to FIG. 12, communication devices performing one-to-one communication may form a multi-communication device FD network. A transmission signal and a reception signal of an FD communication device that performs FD communication may use the same communication resources (frequency and time). Communication devices may simultaneously perform transmission/reception, and a communication device receiving a desired signal and a communication device transmitting a desired signal may be different from each other. Also, some communication devices may perform only HD communication.

For example, referring to FIG. 12, communication scenarios of the multi-communication device FD network may include a scenario in which two communication devices (e.g., a first communication device 1210 and a second communication device 1220) simultaneously perform transmission and reception. Also, the communication scenarios of the multi-communication device FD network may include a scenario in which a fourth communication device 1240 simultaneously performs reception from a third communication device 1230 and transmission to a fifth communication device 1250 (i.e., a transmitting object and a receiving object are different). In this case, the fourth communication device 1240 may perform FD communication.

A reception signal of an FD communication device that performs FD communication may include a self-interference signal, a desired signal, and an external interference signal. In this case, because the desired signal at a signal receiver has to be decoded, it may be assumed that the desired signal is received with higher power than that of the external interference signal. In a multi-FD link environment, the desired signal and the external interference signal may obstruct self-interference channel estimation for self-interference signal cancellation. Accordingly, in order to obtain sufficient self-interference cancellation performance, a self-interference channel has to be estimated by avoiding the desired signal and the external interference signal.

Figure 13:
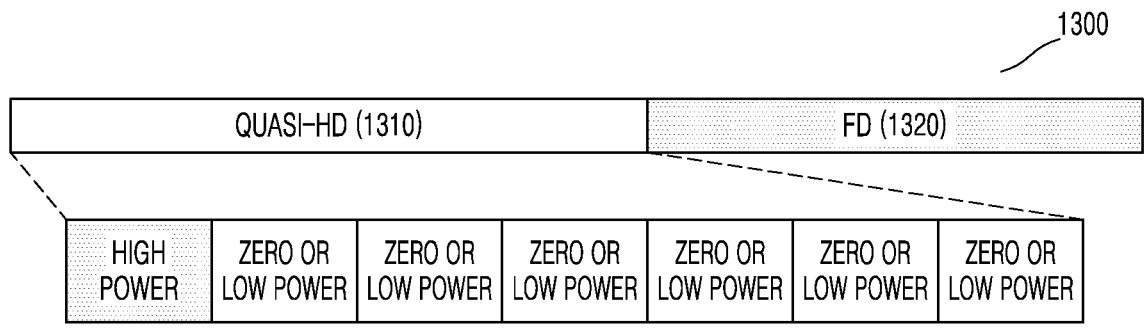
FIG. 13 is a diagram illustrating a transmission frame structure of a communication device in a multi-FD link environment, according to an embodiment.

FIG. 13 is a diagram illustrating a transmission frame structure of a communication device in a multi-FD link environment, according to an embodiment.

Referring to FIG. 13, a transmission frame 1300 in a multi-FD link environment, like in a single FD link environment, may include an FD interval 1320 and a quasi-HD interval 1310. The FD interval 1320 may be an interval in which when an FD communication device transmits data, a signal including the data is transmitted with high power. The FD communication device may receive a desired signal and an external interference signal in addition to a self-interference signal, in the FD interval 1320. The quasi-HD interval 1310 may include a plurality of slots, and each communication device may transmit a signal only in some selected slots (i.e., a high-power transmission interval) in the quasi-HD interval 1310 and may transmit a signal with power close to 0 in remaining slots (i.e., a zero or low-power transmission interval) so that another communication device performs channel estimation for self-interference cancellation. In this case, slots in which a signal is transmitted with low power may be gathered or distributed. In this case, transmission slot pattern determination of the quasi-HD interval 1310, quasi-HD interval pattern allocation for a communication device inside a network, and a frame including the quasi-HD interval 1310 may be determined by a BS for scheduling the communication device.

Also, referring to FIG. 13, a self-interference signal, a desired signal, and an external interference signal may exist in only some slots of the quasi-HD interval 1310, and positions of slots in which signals exist may be different. A quasi-HD interval for self-interference channel estimation does not need to exist in every frame, but may need to be frequently used as a channel change speed is high.

In a multi-FD link environment, a method of determining a transmission slot pattern of a quasi-HD interval of each communication device may be divided into a single slot pattern allocation method and a multi-slot pattern allocation method according to the number of slots to which a high-power transmission interval is allocated.

The single slot pattern allocation method is a method of dividing a quasi-HD interval into a plurality of slots and allocating one slot in the quasi-HD interval in a high-power transmission interval to a communication device in a network. Referring to FIG. 13, each communication device may transmit a signal with high power in only one of slots included in a quasi-HD interval.

The single slot pattern allocation method may be divided into an orthogonal single slot pattern allocation method and a non-orthogonal single slot pattern allocation method. The orthogonal single slot pattern allocation method is a method by which only one communication device transmits a signal with high power in one slot and may not be applied when the number of communication devices in a network is greater than the number of slots included in a quasi-HD interval. The non-orthogonal single slot pattern allocation method is a method by which two or more communication devices may transmit a signal with high power in one slot and may be applied even when the number of communication devices' in a network is greater than the number of slots included in a quasi-HD interval.

FIG. 14 is a diagram illustrating a transmission frame structure of a plurality of communication devices according to an orthogonal single slot allocation method in a multi-FD link environment, according to an embodiment.

An orthogonal single slot allocation method includes orthogonally allocating slots included in a quasi-HD interval to communication devices one by one and allowing only one communication device to transmit a signal with high power in one slot. Low interference between networks may be maintained through the orthogonal single slot allocation method.

The number of the slots included the quasi-HD interval may be equal to or greater than the number of communication devices in a network. When a self-interference channel is estimated through the orthogonal single slot allocation method, a desired signal and an external interference signal may be avoided. Referring to FIG. 14, when four communication devices exist in a network, a high-power signal transmission slot in the quasi-HD interval may be allocated in the orthogonal single slot allocation method to each of the four communication devices.

As shown in FIG. 14, patterns of high-power signal transmission slots in quasi-HD intervals of communication devices may be different from one another, and a signal may be transmitted with low power close to 0 in remaining slots other than a slot in which a signal is transmitted with high power in the quasi-HD interval of each communication device.

A quasi-HD interval pattern determination procedure of an orthogonal single slot allocation method may be as follows: 1) a quasi-HD interval is divided into N slots; 2) N transmission slot patterns may be determined so that only one of the N slots of the quasi-HD interval is used for high-power signal transmission; and 3) the determined N transmission slot patterns may be allocated to up to N communication devices. In this case, one transmission slot pattern may be allocated to only one communication device, and transmission slot patterns of two different communication devices are different from each other.

FIG. 15 is a diagram illustrating a transmission frame structure of a plurality of communication devices according to a non-orthogonal single slot allocation method in a multi-FD link environment, according to an embodiment.

A non-orthogonal single slot allocation method includes non-orthogonally allocating slots included in a quasi-HD interval to communication devices one by one and allowing each communication device to transmit a signal with high power in at least one transmission slot and not to receive a desired signal. In this case, the number of communication devices in a network may be greater than the number of the slots included in the quasi-HD interval. Referring to FIG. 15, when four communication devices exist in a network, a high-power signal transmission slot in the quasi-HD interval may be allocated in the non-orthogonal single slot allocation method to each of the four communication devices.

In FIG. 15, it is assumed that a signal transmitted by a third communication device is not a desired signal of a first communication device and a signal of the first communication device is not a desired signal of the third communication device. In this case, even when the first communication device and the third communication device perform signal transmission with high power in the same slot, the first communication device and the third communication device may not affect each other in channel estimation for self-interference signal cancellation.

That is, a slot in which a desired signal is not received may be allocated as a slot for transmitting a signal with high power regardless of whether there is an external interference signal, to one communication device. One of the slots with low energy and expected to have no desired energy may be allocated as a transmission slot through energy detection during a distribution operation that is a method of allocating a transmission slot by avoiding a desired signal.

A quasi-HD interval pattern determination procedure of a non-orthogonal single slot allocation method may be as follows: 1) a quasi-HD interval is divided into N slots; 2) N transmission slot patterns may be determined so that only one of the N slots of the quasi-HD interval is used for high-power signal transmission; and 3) the determined N transmission slot patterns may be allocated to communication devices in a network. One transmission slot pattern may be allocated to one or more communication devices. In this case, when the same transmission slot pattern is allocated to a plurality of communication devices, the communication devices to which the same transmission pattern is allocated may not form an FD link.

FIG. 16 is a diagram illustrating a transmission frame structure of a communication device according to a multi-slot pattern allocation method in a multi-FD link environment, according to an embodiment.

Unlike a single slot allocation method involving dividing a quasi-HD interval into a plurality of slots and allocating one slot to each communication device in a network, a multi-slot pattern allocation method may involve allocating a plurality of slots to a communication device in a network. In this case, a transmission slot pattern may be determined to avoid a desired signal as much as possible during self-interference channel estimation, and one or more slots may be used for self-interference channel estimation. Also, the multi-slot pattern allocation method has advantages in that because one or more slots are used for high-power signal transmission, a higher data rate than that of a single slot allocation method may be achieved, and because options for selecting slots for channel estimation increase, a diversity gain may be obtained.

The multi-slot pattern allocation method may be divided into a non-deterministic slot pattern allocation method such as a random multi-slot pattern allocation and a deterministic slot pattern allocation method based on specific rules according to uncertainty.

FIG. 17 is a diagram illustrating a transmission frame structure of a plurality of communication devices according to a random selection method in a multi-FD link environment, according to an embodiment.

A random selection method of determining a transmission slot pattern by randomly selecting a transmission slot may be used to determine a position of a high-power transmission slot in a quasi-HD interval. In the random selection method, probabilities that slots included in the quasi-HD interval are selected as high-power transmission slots are the same. In this case, because a high-power transmission slot of one communication device may be allocated as a high-power transmission slot for another communication device through random selection, it may be impossible to control a desired signal and an external interference signal in the high-power transmission slot of the one communication device.

In the random selection method, a slot for self-interference channel estimation may be determined to avoid a desired signal through energy detection of a signal remaining after self-interference cancellation in each slot. Accordingly, excellent self-interference channel estimation performance may be achieved based on the random selection method.

A quasi-HD interval pattern determination procedure of a multi-slot pattern allocation method using random selection may be as follows: 1) a quasi-HD interval is divided into N slots; 2) a density of the quasi-HD interval, that is, the number of slots to be transmitted with high power in the quasi-HD interval, is determined in consideration of a degree of interference in a network; 3) a transmission slot pattern is determined by randomly selecting M slots in the quasi-HD interval based on the determined density of the quasi-HD interval (M≤N); and 4) the determined transmission slot pattern is allocated to communication devices in the network.

FIG. 18 is a diagram illustrating a transmission frame structure of a plurality of communication devices according to a deterministic method in a multi-FD link environment, according to an embodiment.

A deterministic method based on a pre-determined pattern may be used as another method of determining a position of a high-power transmission slot in a quasi-HD interval. A method of determining n consecutive slots as a transmission slot pattern may be used as the deterministic method, and a frame structure in this case is as shown in FIG. 17.

In a multi-slot allocation method of determining n consecutive slots as a transmission slot pattern in FIG. 18, a desired signal may not be received in at least one of the slots determined as high-power transmission slots in any case. A quasi-HD interval pattern determination procedure of a deterministic multi-slot pattern allocation method of determining n consecutive slots as a transmission slot pattern may be as follows: 1) a quasi-HD interval is divided into N slots; 2) a density of the quasi-HD interval, that is, the number of slots for transmitting a signal with high power in the quasi-HD interval, is determined in consideration of a degree of interference in a network; 3) a transmission slot pattern is determined by selecting M consecutive slots based on the determined density of the quasi-HD interval (in this case, one transmission slot pattern may be a circular shift of another transmission slot pattern, and N transmission slot patterns may be used); and 4) the determined transmission slot patterns are allocated to up to N communication devices. In this case, one transmission slot pattern may be allocated to only one communication device, and transmission slot patterns of two different communication devices may always be different from each other.

FIG. 19 is a diagram illustrating a transmission frame structure of a plurality of communication devices determined by using a difference set in a multi-FD link environment, according to an embodiment.

A multi-slot pattern determined by using a different set as another multi-slot pattern allocation method may be allocated to a communication device. The difference set that is a subset of a cyclic group has a length v of a sequence included in the different set and the number k of non-zero elements included in the sequence as parameters.

Also, the number of non-zero elements when two different sequences included in one difference set are randomly selected and element-wise multiplied in the sequences may be denoted by $\lambda$. Types of commonly known difference sets include $(V, k, \lambda)=(7, 3, 1), (7, 4, 2), (11, 5, 2)$, etc.

FIG. 19 illustrates a pattern for determining quasi-HD interval multi-slot positions based on a difference set=(7, 4, 2) in an environment where three communication devices exist. When 1 is allocated to a high-power transmission slot of each communication device and 0 is allocated to a zero or low-power slot, and element-wise multiplication between slot patterns is applied, the number of non-zero elements is always $\lambda=2$.

The following will be described assuming that a desired signal of a first communication device is a signal transmitted by a second communication device in an environment of FIG. 19. Because the first communication device transmits a signal with high power in slots 0, 3, 5, and 6 in a quasi-HD interval whereas the second communication device transmits a desired signal with high power in slots 0 and 6, slots 0 and 6 may be excluded from slot candidates for self-interference channel estimation of the first communication device. However, because the second communication device transmits a desired signal with low power to the first communication device in slots 3 and 5, the first communication device may estimate a self-interference channel by using slots 3 and 5. When more precise self-interference channel estimation is required, because power of an external interference signal in slot 3 may be less than that in slot 5 in which a third communication device transmits a signal with high power, the first communication device may perform self-interference channel estimation through slot 3.

When such a difference set is used for multi-slot pattern allocation, because the number of transmission slots in which a desired signal of each communication device does not exist may be one or more among high-power signal transmission slots of each communication device, options for selecting slots for self-interference channel estimation of the communication device may increase.

A quasi-HD interval pattern determination procedure of a difference set-based deterministic multi-slot pattern allocation method may be as follows: 1) a quasi-HD interval is divided into N slots; 2) parameters of a difference set are determined in consideration of a degree of interference in a network; 3) a transmission slot pattern is determined by using the determined difference set (In this case, one transmission slot pattern may be a circular shift of another transmission slot pattern, and N transmission slot patterns may be used); and 4) the determined transmission slot patterns are allocated to up to N communication devices. In this case, one transmission slot pattern may be allocated to only one communication device, and transmission slot patterns of two different communication devices may always be different from each other.

Self-interference channel estimation in a multi-FD link environment (multi-communication device environment) may be performed in a state where a transmission pattern of communication devices is pre-determined through random multi-slot allocation or deterministic multi-slot allocation.

A communication device may calculate power of an external signal including a desired signal of each slot through channel estimation and self-interference cancellation for each slot of a quasi-HD interval. The communication device may determine that there is a desired signal in a slot in which power of an external signal is relatively high from among slots included in the quasi-HD interval, and may exclude the slot from slot candidates for self-interference channel estimation. The communication device may determine a slot other than the slot determined to have the desired signal in the quasi-HD interval as a slot for self-interference channel estimation.

When more precise self-interference cancellation performance is required, the communication device may perform self-interference channel estimation in slots excluding slots in which power of an external interference signal is relatively high in the quasi-HD interval in addition to the slot determined to have the desired signal, thereby achieving more precise self-interference channel estimation performance. The communication device may estimate a self-interference channel in a transmission slot selected as a slot for self-interference channel estimation in the quasi-HD interval, and may store estimated channel information.

FIG. 20 is a diagram illustrating a structure of a communication device, according to an embodiment.

As shown in FIG. 20, a communication device of the disclosure may include a processor 2001, a transceiver 2002, and a memory 2003. However, elements of the communication device are not limited thereto. The communication device may include more or fewer elements than those illustrated in FIG. 20. In addition, the processor 2001, the transceiver 2002, and the memory 2003 may be implemented as one chip.

The processor 2001 may control a series of processes so that the communication device operates according to an embodiment of the disclosure. The processor 2001 may control elements of the communication device to perform a method of removing a self-interference signal in an FD communication system.

When the communication device of FIG. 20 is a first communication device, the processor 2001 of the first communication device may receive a signal with a size less than a certain value (e.g., a first threshold value) from a second communication device in a first interval (e.g., a zero or low-power transmission interval of the second communication device) within a first frame (that is a transmission/reception frame), and may transmit a first signal to a third communication device in the first interval. In this case, when the second communication device does not transmit a signal in the first interval, the first communication device may only transmit the first signal to the third communication device and may not receive any signal from the second communication device. The processor 2001 may estimate a self-interference channel through which a self-interference signal is transmitted, based on the signal received in the first interval and the first signal transmitted in the first interval. In this case, the self-interference signal may be a signal transmitted by the first communication device and received by the first communication device through the self-interference channel.

The first communication device may be an in-band FD communication device, and the processor 2001 may simultaneously receive a signal from the second communication device and transmit a signal to the third communication device in the same frequency band (e.g., a first frequency band). In this case, a signal transmitted to the second communication device may be transmitted through a second frequency band, and a signal received from the third communication device may be received through a third frequency band. In a single FD link, the third communication device may include the second communication device, and a signal received from the second communication device and a signal transmitted to the second communication device may be simultaneously transmitted/received in the first frequency band.

The processor 2001 may transmit a signal with a size less than a certain value to the second communication device in a second interval in the first frame. In this case, the first interval may be an interval scheduled so that the second communication device transmits a signal with a size less than a certain value (e.g., a first threshold value) to the first communication device, and the second interval may be an interval scheduled so that the first communication device transmits a signal with a size less than a certain value (e.g., a second threshold value) to the second communication device. Also, a frame including the first interval and the second interval may be scheduled for every preset frame.

The processor 2001 may determine a length of the first interval and a length of the second interval, based on spectral efficiency of the first communication device and spectral efficiency of the second communication device. The processor 2001 may calculate a sum of the spectral efficiency of the first communication device and the spectral efficiency of the second communication device based on a ratio of the length of the first interval to a length of the first frame and a ratio of the length of the second interval to the length of the first frame. The processor 2001 may determine the length of the first interval and the length of the second interval, to maximize the sum of the spectral efficiency of the first communication device and the spectral efficiency of the second communication device.

The processor 2001 may receive a desired signal from the second communication device in a third interval, may transmit a second signal to the third communication device in the third interval, and may remove a self-interference signal from a signal received in the third interval including the desired signal based on the second signal and the estimated self-interference channel. Accordingly, the self-interference signal may be removed based on the estimated self-interference channel in a situation where the desired signal is transmitted/received in an FD link.

The transceiver 2002 may transmit/receive a signal to/from a terminal. The signal transmitted/received to/from the terminal may include control information and data. The transceiver 2002 may include a radio frequency (RF) transmitter that up-converts and amplifies a frequency of a transmitted signal, and an RF receiver that performs low-noise amplification on a received signal and down-converts a frequency. However, the transceiver 2002 may be an example, and elements of the transceiver 2002 are not limited to the RF transmitter and the RF receiver. Also, the transceiver 2002 may receive a signal through a wireless channel and may output the signal to the processor 2001, and may transmit a signal output from the processor 2001 through the wireless channel. A plurality of processors 2001 may be provided, and the processor 2001 may perform a method of removing a self-interference signal in an FD communication system of the disclosure by executing programs stored in the memory 2003.

The memory 2003 may store a program and data necessary to operate the communication device. Also, the memory 2003 may store control information or data included in a signal transmitted/received to/from the communication device. The memory 2003 may include a storage medium such as a read-only memory (ROM), a random-access memory (RAM), a hard disc, a compact disc-ROM (CD-ROM), or a digital versatile disk (DVD), or a combination thereof. Also, a plurality of memories 2003 may be provided. The memory 2003 may store a program for performing a method of removing a self-interference signal in an FD communication system. The methods according to claims of the disclosure and/or embodiments of the disclosure may be implemented as hardware, software, or combination of hardware and software.

When a method is implemented as software, a computer-readable storage medium for storing one or more programs (software modules) may be provided. The one or more programs stored in the computer-readable storage medium are configured to be executed by one or more processors in an electronic device. The one or more programs include instructions for allowing the electronic device to execute the methods according to the claims or the embodiments of the disclosure.

These programs (software module and software) may be stored in a RAM, a non-volatile memory including a flash memory, a ROM, an electrically erasable programmable read only memory (EEPROM), a magnetic disc storage device, a CD-ROM, a DVD, another optical storage device, or a magnetic cassette. Alternatively, the programs may be stored in a memory configured by combining some or all of them. Also, the configured memory may include a plurality of memories.

Also, the programs may be stored in an attachable storage device accessible through a communication network such as the Internet, an intranet, a local area network (LAN), a wide LAN (WLAN), or a storage area network (SAN) or a communication thereof. This storage device may connect to a device through an external port. Also, a separate storage device on a communication network may connect to a device.

Self-interference signal cancellation may be precisely performed even during multi-communication device FD communication by adding a quasi-HD interval in which power of a transmission signal is low (or close to 0) to a transmission frame through scheduling of FD communication. Accordingly, the transmission efficiency and reliability of an FD network may be improved in a multi-communication device environment such as a communication environment between vehicles or a mobile environment where FD communication is performed.

Sufficient self-interference cancellation performance may be achieved by estimating a self-interference channel by avoiding an external interference signal with high power and a desired signal obstructing self-interference channel estimation.

In specific embodiments of the disclosure described above, components included in the disclosure were expressed as a single or plural in accordance with the specific embodiments of the disclosure set forth. However, singular or plural representations are selected appropriately for the sake of convenience of description, the disclosure is not limited to the singular or plural constituent elements, and even expressed as a singular element, it may be composed of plural elements, and vice versa.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method of a first communication device for removing a self-interference signal in a wireless communication system, the method comprising:
   receiving a second signal having a signal power less than a first threshold value from a second communication device in a first interval within a first frame;
   transmitting a first signal to the second communication device in the first interval;
   receiving a third signal from the second communication device in a second interval within the first frame;
   transmitting a fourth signal having a signal power less than a second threshold value to the second communication device in the second interval; and
   estimating a self-interference channel through which the self-interference signal is transmitted based on at least one signal received in the first interval and the first signal transmitted in the first interval,
   wherein the first communication device and the second communication device are in-band full-duplex communication devices,
   wherein the self-interference signal is a signal transmitted by the first communication device and is received by the first communication device through the self-interference channel, and
   wherein a length of the first interval and a length of the second interval is determined based on a spectral efficiency of the first communication device and a spectral efficiency of the second communication device.

2. The method of claim 1,
   wherein the second signal received from the second communication device and the first signal transmitted to the second communication device are received and transmitted in a first frequency band.

3. The method of claim 1, wherein the first interval is an interval scheduled such that the second communication device transmits a signal having a signal power less than the first threshold value to the first communication device, and
   wherein the second interval is an interval scheduled such that the first communication device transmits a signal having a signal power less than the second threshold value to the second communication device.

4. The method of claim 3, wherein a frame comprising the first interval and the second interval is scheduled for every preset frame.

5. The method of claim 1, further comprising:
   calculating a sum of the spectral efficiency of the first communication device and the spectral efficiency of the second communication device based on a ratio of the length of the first interval to a length of the first frame and a ratio of the length of the second interval to the length of the first frame; and
   determining the length of the first interval and the length of the second interval to maximize the sum of the spectral efficiency of the first communication device and the spectral efficiency of the second communication device.

6. The method of claim 1, further comprising:
   receiving a desired signal from the second communication device in a third interval within the first frame;
   transmitting a third signal to the second communication device in the third interval; and
   removing the self-interference signal in a signal received in the third interval that includes the desired signal based on the third signal and the estimated self-interference channel.

7. A first communication device for removing a self-interference signal in a wireless communication system, the first communication device comprising:
   a transceiver;
   a memory; and
   at least one processor configured to:
      receive a second signal having a signal power less than a first threshold value from a second communication device in a first interval within a first frame,
      transmit a first signal to the second communication device in the first interval,
      receive a third signal from the second communication device in a second interval within the first frame,
      transmit a fourth signal having a signal power less than a second threshold value to the second communication device in the second interval, and
      estimate a self-interference channel through which the self-interference signal is transmitted based on at least one signal received in the first interval and the first signal transmitted in the first interval,
   wherein the first communication device and the second communication device are in-band full-duplex communication devices,
   wherein the self-interference signal is a signal transmitted by the first communication device and is received by the first communication device through the self-interference channel, and
   wherein a length of the first interval and a length of the second interval is determined based on a spectral efficiency of the first communication device and a spectral efficiency of the second communication device.

8. The first communication device of claim 7,
   wherein the second signal received from the second communication device and the first signal transmitted to the second communication device are received and transmitted in a first frequency band.

9. The first communication device of claim 7, wherein the first interval is an interval scheduled such that the second communication device transmits a signal having a signal power less than the first threshold value to the first communication device, and wherein the second interval is an interval scheduled such that the first communication device transmits a signal having a signal power less than the second threshold value to the second communication device.

10. The first communication device of claim 9, wherein a frame comprising the first interval and the second interval is scheduled for every preset frame.

11. The first communication device of claim 7, wherein the at least one processor is further configured to:

calculate a sum of the spectral efficiency of the first communication device and the spectral efficiency of the second communication device based on a ratio of the length of the first interval to a length of the first frame and a ratio of the length of the second interval to the length of the first frame, and determine the length of the first interval and the length of the second interval to maximize the sum of the spectral efficiency of the first communication device and the spectral efficiency of the second communication device.

12. The first communication device of claim 7, wherein the at least one processor is further configured to:

receive a desired signal from the second communication device in a third interval within the first frame, transmit a third signal to the second communication device, in the third interval, and remove the self-interference signal in a signal received in the third interval that includes the desired signal based on the third signal and the estimated self-interference channel.

* * * * *